United States Patent [19]

Grossman

[11] Patent Number: 5,198,268

[45] Date of Patent: Mar. 30, 1993

[54] METHOD FOR PREPARING A FEED SCREW FOR PROCESSING PLASTICS

[75] Inventor: David Grossman, Epping, N.H.

[73] Assignee: Xaloy, Incorporated, Pulaski, Va.

[21] Appl. No.: 791,510

[22] Filed: Nov. 14, 1991

[51] Int. Cl.⁵ ............................................. B05D 3/02
[52] U.S. Cl. ................................... 427/190; 427/191;
  427/224; 427/225; 427/319; 427/328;
  427/374.4; 427/376.6; 427/380; 427/383.7;
  427/422; 427/427; 419/9; 419/14; 428/564;
  428/680; 428/937
[58] Field of Search ............... 427/190, 191, 224, 225,
  427/319, 328, 376.6, 380, 422, 427, 34, 423,
  374.1, 374.4, 376.8, 383.7; 419/9, 14, 17;
  428/564, 680, 937; 148/13, 13.1; 470/17;
  411/257, 900, 901, 902

[56] References Cited

U.S. PATENT DOCUMENTS

| | | | |
|---|---|---|---|
| 3,996,398 | 12/1976 | Manfredi | 427/191 |
| 4,027,367 | 6/1977 | Rondeau | 427/383.7 |
| 4,136,230 | 1/1979 | Patel | 428/680 |
| 4,173,685 | 11/1979 | Weatherly | 427/191 |
| 4,682,987 | 7/1987 | Brady et al. | 427/376.3 |
| 4,731,253 | 3/1988 | DuBois | 427/423 |
| 4,906,529 | 3/1990 | Brundbjerg et al. | 427/191 |

FOREIGN PATENT DOCUMENTS

| | | | |
|---|---|---|---|
| 49-21213 | 5/1974 | Japan | 427/191 |
| 59-64776 | 4/1984 | Japan | 427/190 |
| 59-200750 | 11/1984 | Japan | 427/191 |

*Primary Examiner*—Shrive Beck
*Assistant Examiner*—Terry J. Owens
*Attorney, Agent, or Firm*—Ostrolenk Faber, Gerb & Soffen

[57] ABSTRACT

Preparation of feed screw having a wear resistant alloy coating thereon for the injection molding or extrusion of plastic. Nickel-based alloys that have shown themselves to be compatible with inlaid barrel liners by virtue of similar wear ratios, modulus of elasticity, ultimate yield strength, and linear thermal coefficients of expansion, are sprayed at high velocity onto a heated feed screw to mechanically bond the alloy to the feed screw. The alloy is then fused to the feed screw in a controlled manner. Following the fusing process, the feed screw and alloy thereon is heated and allowed to cool in a highly controlled environment to produce a crack-free dense coating of the alloy on the screw substrate.

10 Claims, 2 Drawing Sheets

METHOD FOR PREPARING A FEED SCREW FOR PROCESSING PLASTICS

BACKGROUND OF THE INVENTION

1. Field of the Invention

The present invention relates to the manufacture of apparatus used in the injection molding and extrusion of plastic and, more particularly, a feed screw for use in such processes, the feed screw having a wear resistant alloy coating thereon.

2. Description of the Related Art

Feed screws are used in combination with injection molding cylinders and extrusion barrels to process plastics. The feed screws are used to convey, melt, pressurize and pump plastic resins. The screws usually include a coating of a wear resistant alloy on the wear surfaces of the screw, and the barrels and cylinders usually also include a coating of a wear resistant alloy, known as inlay, on the inner surfaces of the barrel or cylinder. Such screws, known as bimetallic screws, have been manufactured by conventional processes, such as detonation cladding.

However, conventional bimetallic screws have a limited lifetime (usually on the order of twelve months) and it has been difficult to apply a nickel-based wear resistant alloy coating to steel feed screws.

OBJECTS OF THE INVENTION

It is an object of the invention to provide a process for coating nickel-based alloys containing carbides onto a feed screw with a good metallurgical bond between the substrate material and the alloy.

Another object of the invention is to provide a process wherein a sprayed coating on a feed screw is metallurgically bonded to the substrate, so as to improve the service life of screws from a standard twelve months to thirty-six months or more.

Yet another object is to provide a process for achieving a crack-free coating of a wear resistant alloy on a feed screw having a complicated geometry, the coating being metallurgically bonded to the substrate.

SUMMARY OF THE INVENTION

These objectives, and other objectives, are achieved by the method of the invention for coating the wear surfaces of an injection molding or extrusion feed screw with a nickel-based alloy containing carbide particles dispersed within the matrix of the alloy. The method includes preheating the alloy to remove moisture therefrom followed by spraying the preheated alloy onto the wear surfaces of the feed screw to form a mechanical bond between the alloy and the feed screw. The spray coated feed screw is then heated, the heating being controlled to achieve even temperature buildup over the entire length of the feed screw. The alloy is then fused to the substrate to transform the mechanical bond of the alloy to the substrate to a metallurgical bond between the same. The feed screw is then again heated so that it may cool in a controlled manner to achieve a crack-free coating of the alloy on the feed screw.

Preferably, the alloy is preheated to a temperature range of about 250 degrees F. to about 300 degrees F., and the surface of the feed screw is cleaned (preferably by degreasing and grit blasting) to remove surface contaminants, oxidation, etc., therefrom. The alloy is sprayed at a minimum particle velocity of about 2,400 ft/sec., onto the cleaned substrate of the feed screw, and then the coated feed screw is heated to a temperature range of about 975 degrees F. to about 1025 degrees F. for about one to about six hours. The alloy is fused to the substrate to metallurgically bond the alloy to the substrate preferably using an open flame, oxygen/acetylene torch in one continuous pass, and then heated to a temperature range of about 850 degrees to about 900 degrees F. for about two to about four hours and cooled at a rate of about 150 degrees F. heat reduction per hour to achieve the crack-free coating of the alloy on the feed screw.

A bimetallic feed screw for injection molding and extruding plastic is also provided. The feed screw has a nickel-based alloy coated thereon, the alloy containing carbide particles dispersed in the matrix of the alloy. The screw is prepared by the above-described method.

BRIEF DESCRIPTION OF THE DRAWINGS

Other features and advantages of the present invention will become apparent when the following description is read in conjunction with the accompanying drawings, in which.

DETAILED DESCRIPTION OF THE PREFERRED EMBODIMENT

Figure 1:
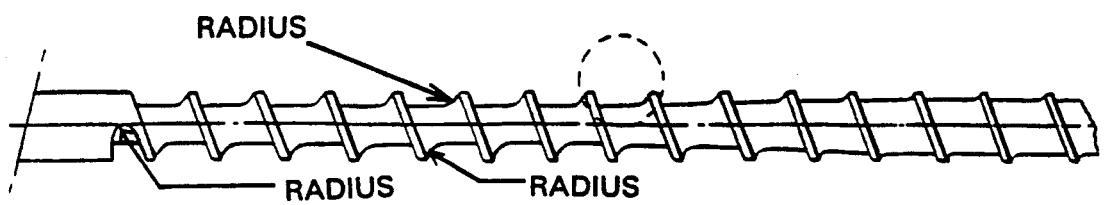
FIG. 1 shows a side view of a feed screw in accordance with the invention.
Figure 2:
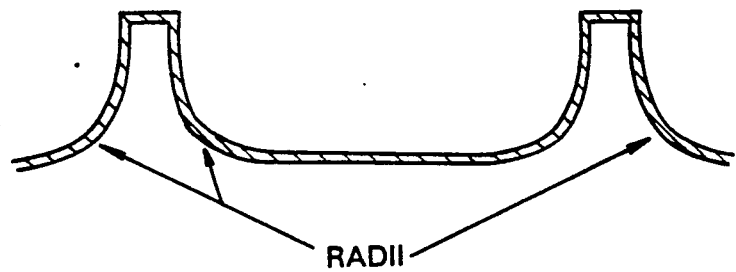
FIG. 2 shows in greater detail the circled portion of the feed screw shown in FIG. 1.

The feed screw which is coated with a wear resistant alloy in accordance with the invention may be any suitable steel with a high strength, low alloy steel, such as AISI 4140 steel being preferred. The feed screw may, if necessary, be cleaned, which may be accomplished in any suitable manner such as by chemical solvents, such as methyl ethyl ketone or acetone, followed by grit blasting using a G-16 grit size aluminum oxide media to remove any surface contaminants or oxidation. During the cleaning, the inventors have discovered that it is imperative that particular attention be paid to all radii, i.e., any curved portion of the screw (see FIGS. 1 and 2), as these are the areas that have historically shown problems with a lack of bonding between the substrate and the coating alloy.

The feed screw is then heated by any suitable means, such as an electrically heated oven. It is imperative that whatever form of heating apparatus used, the apparatus have highly accurate controls so that all heating and cooling cycles can be monitored and controlled to such a degree that all temperature phase transformations of the substrate material are regulated to achieve the desired results. The heating apparatus must be long enough to accommodate the entire length of the feed screw. The feed screw is heated to a temperature about 100 degrees F. below the Mf phase transformation (martensite finish) temperature of the steel substrate of the feed screw. A temperature in the range of about 350 degrees F. to about 400 degrees F. is preferred. Once the screw has reached a temperature within this range, it should be allowed to soak at that temperature for about one hour to assure a complete cross-sectional heating of the screw.

A suitable commercially made heating apparatus that would meet all of the process requirements could not be located so an oven was fabricated for the invention. While the oven was meant to accommodate screws ranging in length from 1' to 24' it was discovered that any air space greater than 4' would prolong the heating cycle and make the control of the cooling cycle very difficult, based on that knowledge the ovens were fabricated so that they could be expanded in size rather than having one full length oven.

Controls for the oven were purchased from Fenwal Controls of Ashland, Mass. and modified so that they would accept data from a thermocouple placed at every 10" of screw length. Data gathered from those thermocouples would then trigger the elements in that 10" zone to either heat or cool to maintain the desired temperature. In addition, the controls monitor and maintain the prescribed heat loss in the ramping down of the temperature. These controls are accurate to +−1% of temperature and will not overrun a setpoint by more than 5% of temperature.

The alloy which will be coated on the feed screw is heated to remove moisture therefrom. The alloy may be heated in a stainless steel tumbler using any suitable heating method such as induction heating to raise the temperature of the alloy to a range of about 250 degrees F. to about 300 degrees F. This heating must be closely controlled. The alloy may be any suitable nickel-based alloy containing carbides within the matrix of the alloy. The suitability of the alloy is determined by its finished compatibility with the inlaid lining of the mating barrel. Several factors enter into the compatibility: modulus of elasticity, wear ratio, hardness, ultimate yield strength, and linear thermal coefficient of expansion. A suitable composite alloy is the below substantially non-ferrous, carbide-containing alloy material comprising the following ingredients fused together in about the proportions set forth below:

| INGREDIENT | WEIGHT PERCENT |
|---|---|
| carbides (Si, W, Cr, Al, etc) | 30–45 |
| nickel | 22–61 |
| cobalt | up to 37 |
| chromium | up to 12 |
| boron | 1.3 to 3.0 |
| silicon | 0.7 to 3.3 |
| iron | up to 3.3 |
| manganese | up to 1.0 |
| carbon | up to 0.6 |

These types of alloys are known as inlay coatings for extruder barrels or injection molding machine cylinders, as disclosed in U.S. Pat. Nos. 3,836,341, 4,863,661 and 5,019,459, which are herein incorporated by reference.

The screw is removed from the oven and may be placed in any suitable machine tool, such as between the centers of a lathe bed, for coating with the alloy. The alloy must be maintained at the temperature described above, and therefore only enough heated alloy is loaded into a powder hopper on any suitable spray apparatus to perform one pass or application of alloy to the screw. The remaining alloy is retained in the tumbler to maintain its temperature. The screw is then sprayed in several passes as it rotates in the lathe bed. The spray hopper is loaded after each pass, and the screw temperature constantly monitored between passes and not allowed to drop below the critical temperature discussed above. Should the temperature of the feed screw drop, the screw should be reheated. To achieve a proper mechanical bond, a spray unit using a velocity of 2,400 ft/sec. or above must be used to spray the alloy onto all the wear surfaces of the feed screw. Each pass must be completed in one application of the alloy to the feed screw, i.e., without interruption of the spraying.

Upon completion of the spraying process, the screw is returned to the oven, which is maintained at a temperature of about 400 degrees F. so that the coated feed screw does not experience thermal shock that might cause cracks or a loss of bonding between the alloy and the substrate. The temperature of the feed screw in the oven is them ramped up to a temperature within the range of about 975 degrees F. to about 1025 degrees F. This takes between about one and about two hours. The coated feed screw is then allowed to soak at that temperature for about one to about six hours.

It will be appreciated that the ramping times, soaking times, and temperatures discussed in this application are dependent upon the mass and substrate material of the particular screw being coated. As the mass of the feed screw increases, its rate of heat loss increases exponentially. This heat loss through conduction and radiation determines the time frame for both the ramping and soaking of temperatures. While mass determines the time frames, the substrate material determines the temperature at which it is soaked. With certain materials, temperatures in excess of 1000 degrees F. would cause it to enter a temperature phase that might cause distortion or loss of temper while in other substrate materials a lesser temperature might be insufficient to guarantee a satisfactory mechanical bond and jeopardize the fusing process. These considerations allow us to insure a thoroughly heated screw that will be at the corrected temperature for the fusing process. The appropriate ramping time, soaking time and temperature will be apparent to one skilled in the art.

The feed screw is then removed from the oven after is has been thoroughly heated and again placed in any suitable machine tool such as the centers of the lathe bed mentioned above, for fusing of the alloy to the screw. Any suitable means, such as an oxygen/acetylene open flame torch may be used for this purpose. An infrared pyrometer or other suitable device must be mounted on the tool holder of the lathe to monitor the temperature of the feed screw. The flame of the torch is brought into contact with the surface of the screw, and the pyrometer is focused on that area of contact. When the pyrometer registers a surface temperature of between about 1975 degrees F. and about 2050 degrees F., the screw may be rotated and the torch moved down the full length of the screw. The temperature parameter for the fusing process is dependent upon the flow temperature of the master alloy and the melting temperature of the substrate material. Once the master alloy starts to flow, it causes a capillary wetting action of the base material thereby achieving a metallurgical interface (coalescence) between the two. In some cases, because of thermal differences, a master alloy and a substrate material may not be compatible. Once the fusing temperature has been determined, it is accurately monitored during the entire process lest areas of non interface occur. The torch travel speed and the screw rotation speed are adjusted so as to maintain a surface temperature sufficient to metallurgically fuse the alloy to the feed screw's substrate material. Speeds of between 0.5 and 3 rpm. for the screw rotation are suitable, and a travel speed for the torch of between 1 ipm and 4 ipm covers the range of screw sizes. It being understood, however, that torch travel speed and screw rotation speed are based solely on pyrometric temperature readings and other speeds will be apparent to one skilled in the art. The accuracy of the pyrometer will contribute greatly to the success of the fusing as in certain instances a variance of 25 degrees F. is enough to either cause a failure to coalesce or cause the master alloy to sag and run off the substrate.

Upon completion of the fusing process, the coated feed screw is again heated. The feed screw is placed into the oven discussed above or other suitable device which is preheated to the M50 (50% Martensite Transformation) temperature of the screw substrate, a temperature of about 465 degrees F. to about 750 degrees F. is preferred. The temperature of the feed screw is then ramped up to a minimum of about 100 degrees F. above the Ms (martensite start) temperature of the screw substrate. A temperature range of about 850 degrees F. to about 900 degrees F. is typical. The screw is then allowed to soak at that temperature for about two to about four hours and then the screw's temperature is ramped down to about 100 degrees F. below the Mf (martensite finish) temperature of the screw substrate. The temperature of the feed screw is preferably ramped down to about 400 degrees F. This ramping down should be controlled so that it does not occur at a rate of heat loss greater than about 125 degrees F. per hour. Once the screw has arrived at a temperature of about 400 degrees F., it may be allowed to cool in the oven at its own rate of heat loss until it reaches ambient temperature.

Again, it will be appreciated that the thermal cycles described are solely based on the screw substrate material and mass and will vary depending upon the same. In some cases, a screw of substantial size (6" diameter × 16 feet in length) may have a BTU loss so significant that is must have its temperature reduction controlled until it has reached ambient rather than allowing it to self cool, while in other cases a substrate material may not be heat effected and not require the finite temperature controls prescribed above.

The following examples illustrate the method in accordance with the invention for preparing a steel feed screw having a crack-free coating of wear resistant nickel-based alloy thereon.

EXAMPLE 1

A master alloy having the following composition was used to coat an AISI 4140 Steel feed screw: 45% Carbides, 7% Chromium, 3.4% Carbon, 0.2% Iron, 1.3% Boron, 2.2% Silicon, 40.9% Nickel. This master alloy was prepared in a −270/D mesh size. The feed screw was preground so that the outside diameter was 0.020 of an inch over a finished diameter of 2.743 inches. At the same time other dimensions (flite width, root diameter, radii, etc.) were milled so that they were 0.020 to 0.025 undersized.

The screw was preheated to a temperature of 400 degrees F. while the alloy was heated to 250 degrees F. The alloy was sprayed at 2,650 ft/sec. onto the screw and placed into an oven already at 400 degrees F. The screw was heated to 985 degrees F. and allowed to soak for three hours. The screw was then fused at 2050 degrees F. and returned to an oven preheated to 465 degrees F. then ramped up to 850 degrees F. and soaked for four hours, cooled at 100 degrees F. per hour till 375 degrees F. and then allowed to cool at its own rate. The screw was then O.D. ground to 2.743 inches × 69.67 inches long with a flite width of 0.270 inches.

Figure 3:
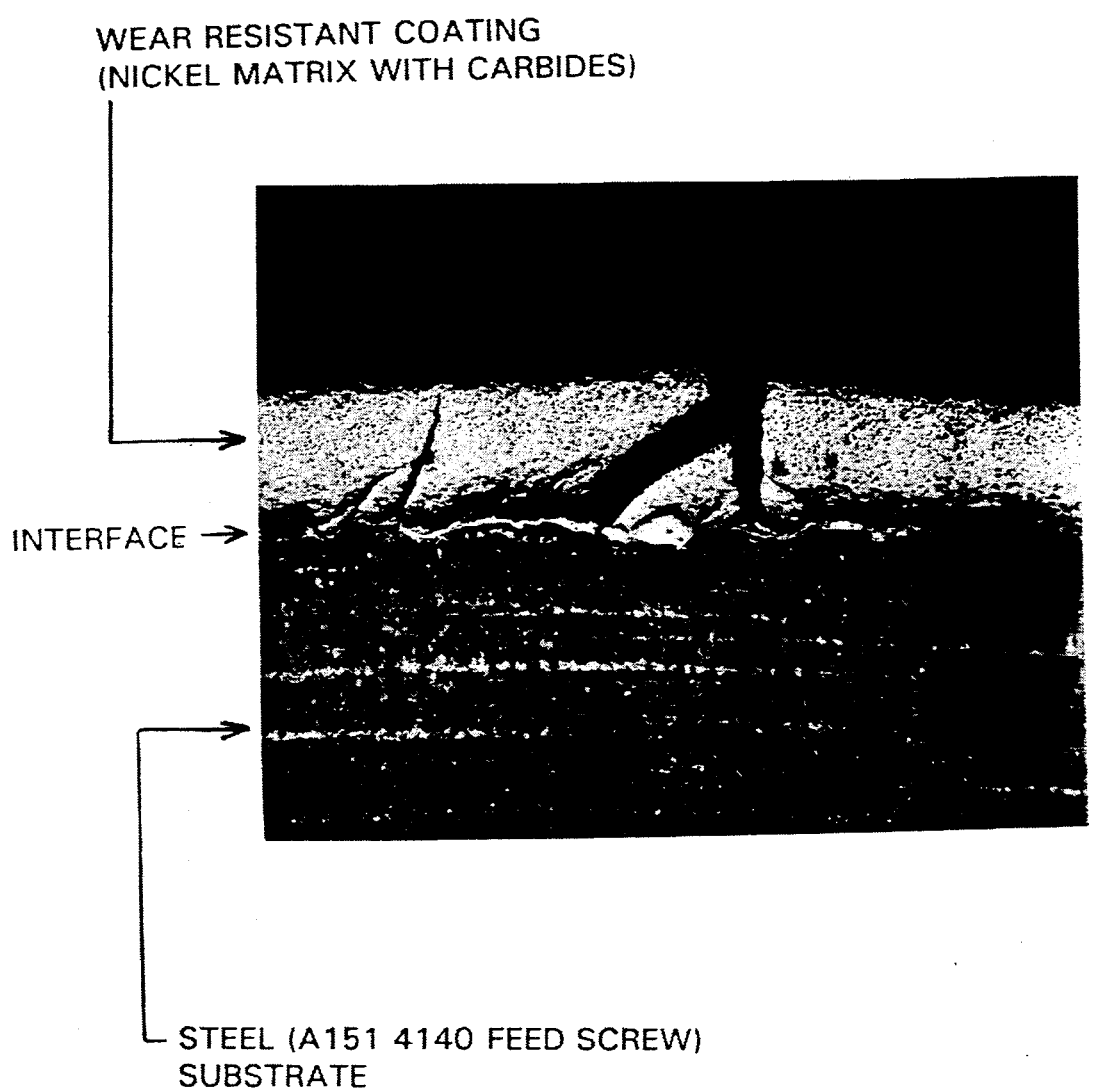
FIG. 3 is a microphotograph of a cross-section of a feed screw in accordance with the invention showing the wear resistant alloy coating, the steel feed screw substrate, and the interface therebetween.

The overlay was 60 Rc while the screw's base material was 28–32 Rc. Three coupons were then cut from the screw root surface. These coupons were 1 inch square by 3 inches long. These coupons were subject to a three point bend test until they fractured. In each case a strain of 11.1% was required to initiate the fracture. In each case, while the overlay fractured, it did not propagate into the basestrate (see FIG. 3) and the bond between overlay and basestrate did not fail. (An 11.1% strain equates to 15,873 psi. in stress.) The substrate fracture only ran adjacent to the interface.

EXAMPLE 2

A screw of AISI 4140 was prepared as in Example 1 but the master overlay was on the following composition: 40% Carbides, 0.52% Carbon, 9.7% Chromium, 2.6% Iron, 1.9% Boron, 2.4% Silicon, 42.88% Nickel. The overlay was 58 to 63 Rc. The basestrate was 30 Rc. Again, a three point bend test was performed on three coupons and a strain of 10.3% was required to fracture the overlay; but again the fracture did not extend into the basestrate or cause a failure in the bond between the overlay and the basestrate. A 10.3% strain equates to 14,729 psi stress.

EXAMPLE 3

A screw of Nitriding Steel #135 modified was coated using the same alloy as in Example 1. The overlay hardness was 61–63 Rc while the base material was 30 to 35 Rc. The screw was preheated to 350 degrees F. before spraying, then after spraying returned to a 350 degrees F. oven and heated to 975 degrees F. and soaked for three hours. After fusing, the screw was placed in a 350 degree F. oven and ramped up in temperature to 800 degrees F. and slow cooled after a four hour soak. The overlay fractured at 14,036 psi. But again, only the alloy fractured.

Although the present invention has been described in connection with a preferred embodiment thereof, many other variations and modification will become apparent to those skilled in the art without departing from the scope of the invention. It is preferred therefore, that the present invention not be limited by the specific disclosure herein, but only by the appended claims.

What is claimed is:

1. A method for coating the wear surfaces of a feed screw for injection molding or extruding plastic with a nickel-based alloy containing carbide particles dispersed within the matrix of the alloy, the method comprising the steps of:
   (a) spraying the alloy onto the feed screw, the alloy forming a mechanical bond to the feed screw;
   (b) heating the feed screw having the alloy sprayed thereon, the heating being controlled to cause even temperature buildup over the length of and through the feed screw;
   (c) fusing the alloy to the feed screw to transform the mechanical bond between the alloy and the feed screw into a metallurgical bond between the alloy and the feed screw; and
   (d) heating the metallurgically bonded alloy and feed screw and cooling the metallurgically bonded alloy and feed screw to produce a crack-free coating of the alloy on the feed screw, wherein the step of heating and cooling the metallurgically bonded alloy and feed screw comprises heating the alloy and feed screw to a temperature within the range of about 850 degrees F. to about 900 degrees F. for about two to about four hours and cooling the metallurgically bonded alloy and feed screw at a rate of about 100 degrees F. to about 150 degrees F. heat reduction per hour.

2. The method of claim 1, further comprising the step of preheating the alloy prior to spraying the alloy onto the feed screw.

3. The method of claim 2, wherein the step of preheating the alloy comprises preheating the alloy to a temperature within the range of about 250 degrees F. to about 300 degrees F.

4. The method of claim 1, further comprising the step of cleaning the wear surfaces of the feed screw prior to spraying the alloy onto the feed screw.

5. The method of claim 4, wherein the step of cleaning the wear surfaces of the feed screw comprises degreasing the wear surfaces of the feed screw.

6. The method of claim 5, wherein the step of cleaning the wear surface of the feed screw further comprises grit blasting the wear surfaces of the feed screw with a G-16 grit size aluminum oxide medium.

7. The method of claim 1, wherein the step of spraying the alloy onto the feed screw comprises spraying the alloy onto the feed screw in a single application of the alloy to the feed screw.

8. The method of claim 7, wherein the step of spraying the alloy onto the feed screw comprises spraying the alloy onto the wear surfaces of the feed screw at a minimum particle velocity of about 2400 ft/sec.

9. The method of claim 1, wherein the step of heating the feed screw having the alloy sprayed thereon comprises heating the screw and alloy to a temperature of about 975 degrees F. to about 1025 degrees F. for about one to about six hours.

10. The method of claim 1, wherein the step of fusing the alloy to the feed screw comprises continuously passing the feed screw having the alloy mechanically bonded thereon in proximity to an open flame oxygen/acetylene torch.

* * * * *